US010441906B2

(12) United States Patent
Holton et al.

(10) Patent No.: US 10,441,906 B2
(45) Date of Patent: Oct. 15, 2019

(54) COMPOUND ANGLE WEDGE SCREEN CLAMP FOR VIBRATORY SEPARATOR

(75) Inventors: Benjamin Lanning Holton, Cincinnati, OH (US); Brian S. Carr, Burlington Boone, KY (US); Graham Robertson, Edinburgh (GB); John Fedders, Florence, KY (US)

(73) Assignees: M-I L.L.C., Houston, TX (US); UNITED WIRE, LTD, Aberdeen (GB)

( * ) Notice: Subject to any disclaimer, the term of this patent is extended or adjusted under 35 U.S.C. 154(b) by 1231 days.

(21) Appl. No.: 14/131,620

(22) PCT Filed: Jul. 6, 2012

(86) PCT No.: PCT/US2012/045786
§ 371 (c)(1),
(2), (4) Date: Apr. 8, 2014

(87) PCT Pub. No.: WO2013/009628
PCT Pub. Date: Jan. 17, 2013

(65) Prior Publication Data
US 2014/0217002 A1    Aug. 7, 2014

Related U.S. Application Data

(60) Provisional application No. 61/505,704, filed on Jul. 8, 2011.

(51) Int. Cl.
*B01D 33/80*        (2006.01)
*E21B 21/06*        (2006.01)

(52) U.S. Cl.
CPC ............ *B01D 33/80* (2013.01); *E21B 21/065* (2013.01)

(58) Field of Classification Search
CPC ........ E21B 21/065; E21B 43/10; E21B 43/08; E21B 21/06; B01D 33/80
(Continued)

(56) References Cited

U.S. PATENT DOCUMENTS 3,795,311 A * 3/1974 Martin ...................... B07B 1/49
209/395
4,909,929 A * 3/1990 Tabor ................... B01D 25/002
209/395

(Continued)

OTHER PUBLICATIONS

International Search Report of PCT/US2012/045786 dated Apr. 25, 2013, 6 pages.

(Continued)

*Primary Examiner* — Robert Clemente
*Assistant Examiner* — Akash K Varma
(74) *Attorney, Agent, or Firm* — Jeffrey D. Frantz (57) ABSTRACT

A wedging apparatus for a vibrating separator including an outer polygonal surface to secure a screen to the vibrating separator, wherein the outer polygonal surface extends substantially along the length of a screening surface of the vibrating separator is disclosed. A screen for a vibratory separator including a frame having a top surface and a bottom surface, and at least one filter element connected to the frame, wherein the bottom surface comprises a wedge engagement profile is also disclosed. A vibrating separator apparatus including a first side wall, a second side wall opposite the first side wall, a bottom wall connecting the first side wall and the second side wall, a first screen having a top surface and a bottom surface, at least one wedging apparatus disposed along the length of the bottom surface of the first screen is also disclosed.

18 Claims, 9 Drawing Sheets

(58) Field of Classification Search
USPC .................................... 210/236, 232, 384
See application file for complete search history.

(56) References Cited

U.S. PATENT DOCUMENTS

| | | | |
|---|---|---|---|
| 5,006,228 A | 4/1991 | Anderson et al. | |
| 5,811,003 A * | 9/1998 | Young ................ | B01D 33/0346 209/399 |
| 2004/0074816 A1 | 4/2004 | Seyffert et al. | |
| 2005/0258081 A1 * | 11/2005 | Carr ......................... | B07B 1/46 209/399 |
| 2005/0274653 A1 * | 12/2005 | LaVeine .................... | B07B 1/28 209/310 |
| 2007/0000817 A1 | 1/2007 | Malberg | |
| 2008/0078699 A1 * | 4/2008 | Carr ...................... | E21B 21/065 209/233 |
| 2008/0078705 A1 * | 4/2008 | Carr ...................... | B07B 1/4618 209/403 |

OTHER PUBLICATIONS

International Preliminary Report on Patentability for the equivalent International patent application PCT/US2012/045786 dated Jan. 23, 2014.
Office Action for the equivalent Mexican patent application MX/a/2004/000287 dated Feb. 23, 2016.
Office Action for the equivalent Mexican patent application MX/a/2004/000287 dated Oct. 31, 2016.
Office Action for the equivalent Mexican patent application MX/a/2004/000287 dated Jun. 13, 2017.
Office Action for the equivalent Mexican patent application MX/a/2004/000287 dated Dec. 8, 2017.

* cited by examiner

COMPOUND ANGLE WEDGE SCREEN CLAMP FOR VIBRATORY SEPARATOR

BACKGROUND

Oilfield drilling fluid, often called "mud," serves multiple purposes in the industry. Among its many functions, the drilling mud acts as a lubricant to cool rotary drill bits and facilitate faster cutting rates. The mud is mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

Drilling mud provides a column of hydrostatic pressure, or head, to prevent "blow out" of the well being drilled. This hydrostatic pressure offsets formation pressures thereby preventing fluids from blowing out if pressurized deposits in the formation are breeched. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Drilling mud weight is reported in "pounds," short for pounds per gallon. Generally, increasing the amount of weighting agent solute dissolved in the mud base will create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

Another purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling mud. Before the mud can be recycled and re-pumped down through nozzles of the drill bit, the cutting particulates have to be removed.

One type of apparatus used to remove cuttings and other solid particulates from drilling mud is commonly referred to in the industry as a "shale shaker" A shale shaker, also known as a vibratory separator, is a vibrating sieve-like table upon which returning used drilling mud is deposited and through which substantially cleaner drilling mud emerges. The shale shaker is an angled table with a generally perforated filter screen bottom. Returning drilling mud is deposited at the top of the shale shaker. As the drilling mud travels down the incline toward the lower end, the fluid falls through the perforations to a reservoir below thereby leaving the solid particulate material behind. The combination of the angle of inclination with the vibrating action of the shale shaker table enables the solid particles left behind to flow until they fall off the lower end of the shaker table.

The above described apparatus is illustrative of one type of shale shaker known to those of ordinary skill in the art. In alternate shale shakers, the top edge of the shaker may be relatively closer to the ground than the lower end. In such shale shakers, the angle of inclination may require the movement of particulates in a generally upward direction. In still other shale shakers, the table may not be angled, thus the vibrating action of the shaker alone may enable particle/fluid separation. Regardless, table inclination and/or design variations of existing shale shakers should not be considered a limitation of the present disclosure.

The amount of vibration and the angle of inclination of the shale shaker table are adjustable to accommodate various drilling mud flow rates and particulate percentages in the drilling mud. After the fluid passes through the perforated bottom of the shale shaker, it may either return to service in the borehole immediately, be stored for measurement and evaluation, or pass through an additional piece of equipment (e.g., a centrifuge or a smaller sized shale shaker) to remove smaller cuttings and/or particulate matter.

Because shale shakers are in continuous use, repair operations, and associated downtimes, need to be minimized as much as possible. Often, the filter screens of shale shakers, through which the solids are separated from the drilling mud, wear out over time and subsequently require replacement. Therefore, shale shaker filter screens are constructed to be quickly removable and easily replaceable. Generally, through the loosening of several bolts, the filter screen may be lifted out of the shaker assembly and replaced within a matter of minutes. While there are numerous styles and sizes of filter screens, they generally follow similar design.

Filter screens include a perforated plate base upon which a wire mesh, and/or other perforated filter overlay, is positioned. The perforated plate base generally provides structural support and allows the passage of fluids therethrough. While many perforated plate bases are flat or slightly arched, it should be understood that perforated plate bases having a plurality of corrugated or pyramid-shaped channels extending thereacross may be used instead. Pyramid-shaped channels may provide additional surface area for the fluid-solid separation process while guiding solids along their length toward the end of the shale shaker from where they are disposed.

In some shale shakers, a fine screen cloth is used with the vibrating screen. The screen may have two or more overlying layers of screen cloth and/or mesh. Layers of cloth or mesh may be bonded together and placed over a support, supports, or a perforated or apertured plate. The frame of the vibrating screen is resiliently suspended or mounted upon a support and is caused to vibrate by a vibrating mechanism (e.g., an unbalanced weight on a rotating shaft connected to the frame). Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

Figure 1:
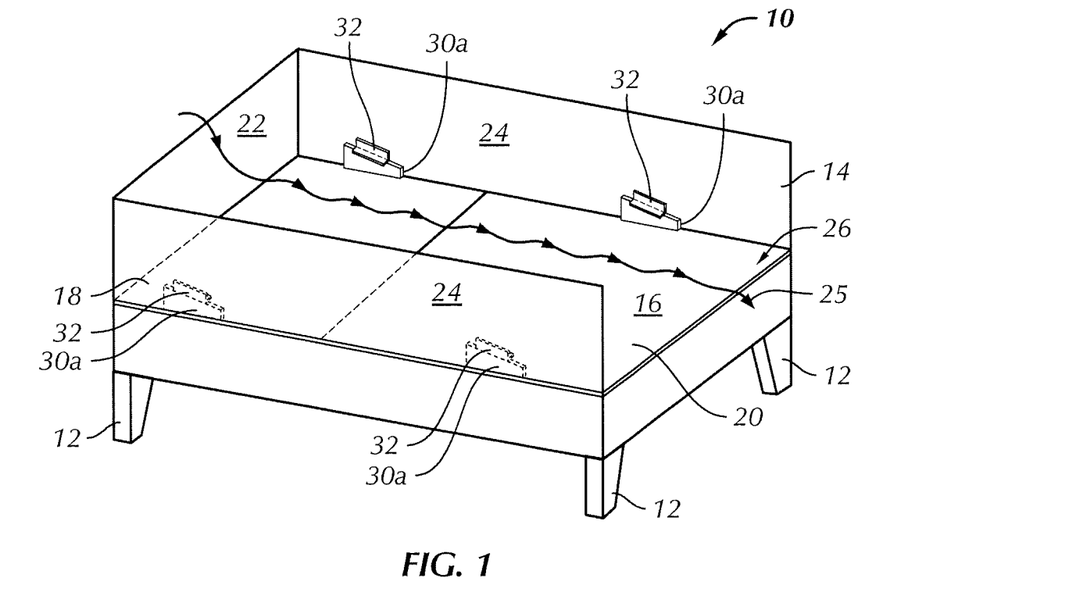
FIG. 1 is a perspective view of a conventional vibratory separator screen system.

FIG. 1 shows a conventional vibratory separator apparatus that includes a lower frame 12 and an upper basket 14. The vibratory separator apparatus 10 may have a variety of shapes and configurations, but generally it is intended to receive solids-laden mud from a distribution box (not shown) into the basket 14 that is vibrated by a motor (not shown) relative to the frame 12. The basket 14 includes an upstream end 18, a downstream end 20, a back wall 22 at the upstream end 18, and two side walls 24. The downstream end 20 is open. In operation, drilling mud including suspended solids is poured into the basket 14 over the back wall 22 and onto screen 16. Once on the screen 16, the solids-laden mud is vibrated toward the downstream end 20, which causes the mud to pass through the screen 16 into a collection box (not shown), and out of the vibratory separator apparatus 10 for further processing. The flow of the solids-laden mud is indicated at 25 in FIG. 1. The solids continue to be conveyed downstream on the screen 16 toward the open end 26 where they are either dropped onto another screen for further separation or discarded.

Screen 16 may be mounted in the basket 14 with wedges 30a that are hammered into place under wedge angles 32 that are welded to the inside of basket 14 at an angle corresponding to the angle of the wedge 30a. In this manner, the screens 16 were installed by placing a pre-tensioned screen 16 onto support rails (not shown) in basket 14. Once in place, a wedge 30a is placed on top of the pre-tensioned screen 16 under wedge angle 32 and then hammered into engagement with the wedge angle 32 to apply a downward force on the screen 16. Accordingly, contact between the screen 16 and the support rail (not shown) in basket 14 may be maintained.

A vibratory separator has multiple screens which are held in place by two wedges, one on each side of each screen. Changing the screens on a vibratory separator having multiple screens is a time consuming process for removing multiple wedges for each screen. Accordingly, there exists a need to reduce the amount of time required for screen changes.

SUMMARY

In one aspect, embodiments disclosed herein relate to a wedging apparatus for a vibrating separator including an outer polygonal surface for securing a screen to the vibrating separator, the outer polygonal surface including a bottom surface, a top surface opposite the bottom surface, and at least one end surface joining the top surface and the bottom surface, in which the outer polygonal surface extends substantially along the length of a screening surface of the vibrating separator.

In another aspect, embodiments disclosed herein relate to a screen for a vibratory separator including a frame having a top surface and a bottom surface, and at least one filter element connected to the frame, the bottom surface including a wedge engagement profile.

In another aspect, embodiments disclosed herein relate to a vibrating separator apparatus including a first side wall, a second side wall opposite the first side wall, a bottom wall connecting the first side wall and the second side wall, a first screen having a top surface and a bottom surface, at least one wedging apparatus disposed along the length of the bottom surface of the first screen.

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and advantages of the invention will be apparent from the following description and the appended claims.

DETAILED DESCRIPTION

In one aspect, embodiments disclosed herein relate to vibratory separator. More specifically, embodiments disclosed herein relate to wedging apparatuses for securing screens to a vibratory separator. In another aspect, embodiments disclosed herein relate to screens for use with wedging apparatuses in a vibratory separator.

Figure 2:
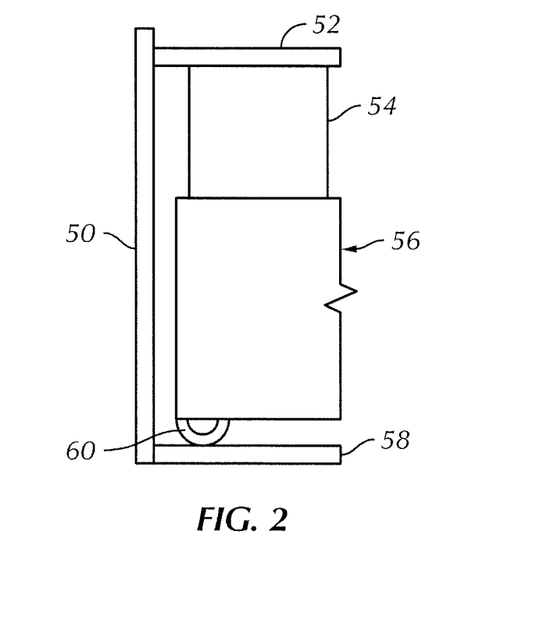
FIG. 2 illustrates an end view of a shaker screen assembly in accordance with embodiments disclosed herein.

FIG. 2 shows an end view of a shaker screen assembly in accordance with embodiments disclosed herein. In this embodiment, a wall 50 of a vibratory separator basket is illustrated including a wedge bracket 52. A wedging apparatus 54 may be disposed between wedge bracket 52 and a vibratory separator screen 56. Wedging apparatus 54 may include any generally polygonal shaped structure capable of applying compressive force on vibratory separator screen 56 and a vibratory separator basket perimeter or support rail 58. The compressive force may be applied along the entire length of the vibratory separator screen 56. A sealing element 60 may be disposed between vibratory separator screen 56 and support rail 58 to, for example, reduce leakage of drilling fluid and/or particulate matter therethrough. In some embodiments, the wedge bracket 52 and support rail 58 traverse the entire length of the vibratory separator basket. Although not shown, a complimentary shaker screen assembly is on the opposite wall of the vibratory separator basket.

Alternatively, the wedging apparatus 54 may be disposed between support rail 58 and the vibratory separator screen 56 with the wedging apparatus 54 applying compressive force on vibratory separator screen 56 and a vibratory separator basket perimeter or wedge bracket 52. The sealing element 60 may be disposed between vibratory separator screen 56 and wedge bracket 52 to, for example, reduce leakage of drilling fluid and/or particulate matter therethrough.

Figure 3A:
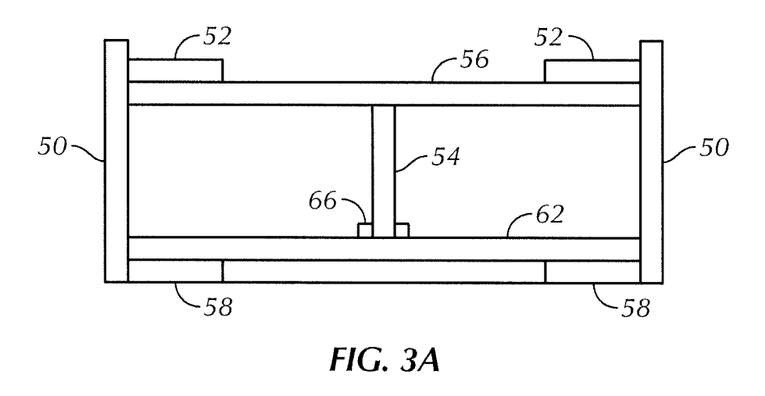
FIGS. 3A-3B illustrates end views of a shaker screen assembly in accordance with embodiments disclosed herein

FIG. 3A shows an end view of a shaker screen assembly in accordance with embodiments disclosed herein. In some embodiments, a single wedging apparatus 54 is placed in the proximate center of the vibratory separator basket underneath the vibratory separator screen 56. A lower support bar 62 may traverse the width of the vibratory separator basket and be supported by the support rail 58. Alternatively, a plurality of lower support bars 62 may be placed along the length of the support rail 58. The lower support bar 62 may include a wedge retainer 66. The wedge retainer 66 may traverse the length of the vibratory separator basket and be coupled at each lower support bar 62. In some embodiments, the wedge retainer 66 traverses the width of the lower support bar 62 or may be slightly longer than the width of the lower support bar 62. The wedge retainer 66 may be configured to slidably engage the wedging apparatus 54. The wedge retainer 66 may provide a channel for the wedging apparatus 54 to be inserted within. Wedge retainer 66 may be any shape known in the art such that the wedging apparatus 54 remains engaged with the screen 56 during operation. Alternatively, the single wedging apparatus 54 may be placed underneath the vibratory separator screen 56 anywhere in the vibratory separator basket.

Figure 3B:
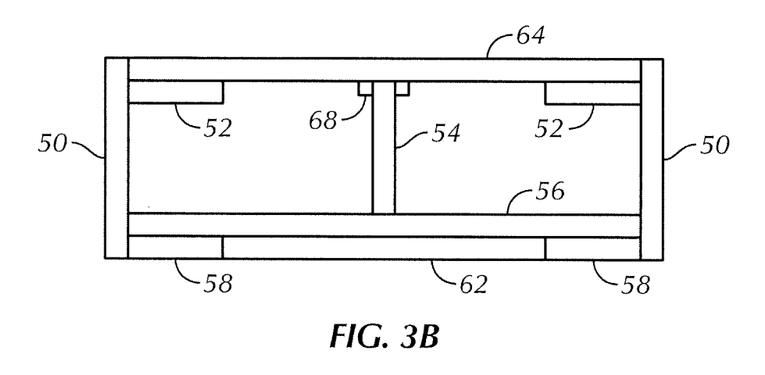

FIG. 3B shows an end view of a shaker screen assembly in accordance with embodiments disclosed herein. In some embodiments, a single wedging apparatus 54 is placed in the proximate center of the vibratory separator basket above the vibratory separator screen 56. An upper support bar 64 may traverse the width of the vibratory separator basket and be supported by the wedge bracket 52. Alternatively, a plurality of upper support bars 64 may be placed along the length of the wedge bracket 52. The upper support bar 64 may include a wedge retainer 68. The wedge retainer 68 may traverse the length of the vibratory separator basket and be coupled at each upper support bar 68. In some embodiments, the wedge retainer 68 traverses the width of the upper support bar 64 or may be slightly longer than the width of the upper support bar 64. The wedge retainer 68 may be configured to slidably engage the wedging apparatus 54. The wedge retainer 68 may provide a channel for the wedging apparatus 54 to be inserted within Wedge retainer 68 may be any shape known in the art such that the wedging apparatus 54 remains engaged with the screen 56 during operation.

Figure 4A:
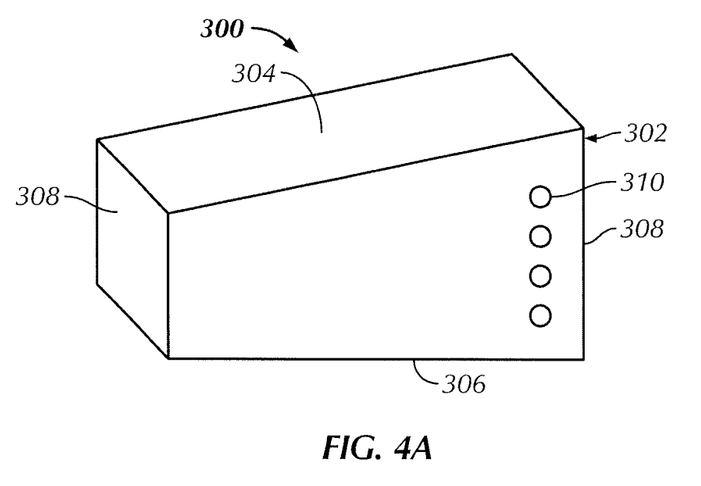
FIGS. 4A-4D illustrate cross-sectional views of embodiments of a wedging apparatus in accordance with embodiments disclosed herein.
Figure 4B:
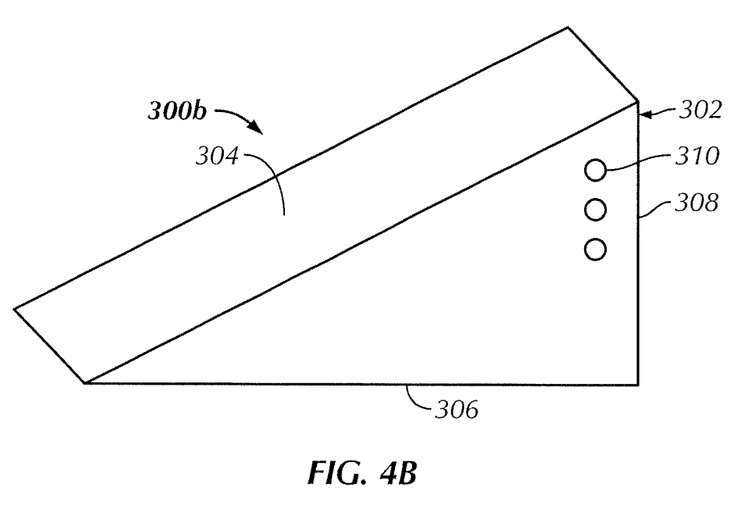

FIG. 4A shows a wedging apparatus 300 in accordance with embodiments disclosed herein. As shown, wedging apparatus 300 includes an outer polygonal surface 302 that includes a top surface 304, a bottom surface 306, and two end surfaces 308 joining top surface 304 and bottom surface 306. Wedging apparatus 300 may be any shape known in the art such that the wedging apparatus may wedge between two vibratory separator components, thereby securing a screen. The length of the wedging apparatus 300 may be substantially the length of the screening surface of the vibrating separator. One or more apertures 310 may be located within the wedging apparatus 300 to enable a pry bar or hammer to be used to remove the wedge from the vibratory separator basket (not shown). The aperture 310 may be located at the end of the wedging apparatus that is proximate the discharge end of the basket. Alternatively, one or more protrusions may be located within the wedging apparatus 300 to enable a pry bar or hammer to be used to remove the wedge from the vibratory separator basket. In some embodiments, wedging apparatus 300 may further include an inner support structure. In some embodiments, the inner support structure may include rods (steel or other such reinforcing material) or any other material for reinforcing the structure of the wedging apparatus 300. Referring briefly to FIG. 4B, in alternate embodiments, wedging apparatus 300b may include one end surface 308, thereby forming a wedging apparatus 300b of a substantially triangular shape.

Figure 4C:
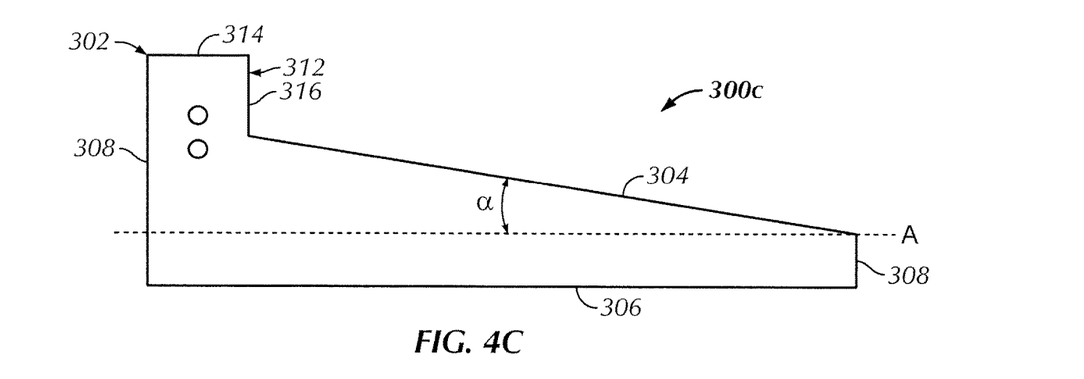
Figure 4D:
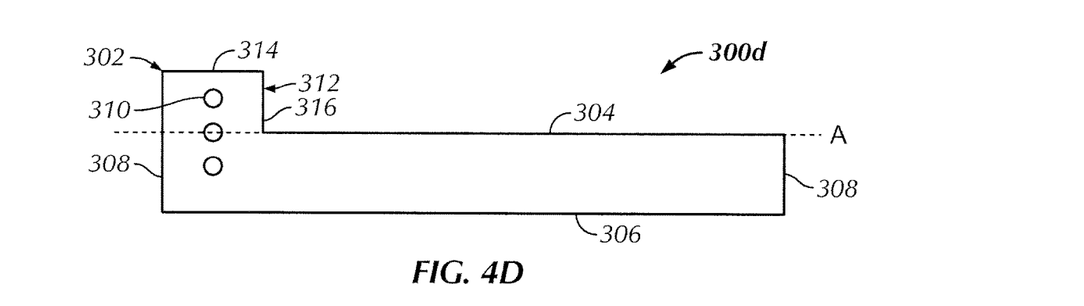

In alternate embodiments, as shown in FIGS. 4C and 4D, wedging apparatus 300c, 300d may include a stop 312. Stop 312 may be any shape known in the art to limit how far the wedging apparatus 300c, 300d may be inserted into a vibrator separator. In some embodiments, the stop 312 includes a first surface 314 and a stop surface 316. The stop surface 316 joins a top surface 304 and the first surface 314. The first surface 314 joins the stop surface 316 and the end surface 308. Alternatively, the stop 312 may be used as an area to use a hammer on to remove the wedging apparatus 300c, 300d.

A wedge bracket (not shown) may be attached to the vibratory separator basket at any angle to correspond with an angle of top surface 304 or bottom surface 306, depending on the direction the wedging apparatus 300c, 300d is installed. A support rail (not shown) may be attached to the vibratory separator basket at a particular angle to correspond with the angle of top surface 304 or bottom surface 306, depending on the direction the wedging apparatus 300c, 300d is installed.

Top surface 304 may be configured to slidably engage the wedge bracket or the support rail of a vibrating separator. Accordingly, top surface 304 may be formed at an angle α with respect to a horizontal axis A. For example, in one embodiment, the angle α of top surface 304 may be about 0 degrees, about 5 degrees, about 30 degrees, about 45 degrees, or any other angle desired by an operator. In an alternate embodiment, top surface 304 may be formed at an angle of about 0 degrees while bottom surface 306 may be formed at a particular angle with respect to horizontal axis A. Referring briefly to FIG. 4D, in alternate embodiments, top surface 304 may be formed at an angle of about 0 degrees, while bottom surface 306 may be formed at an angle of about 0 degrees. In some embodiments, the relative slope between the top surface 304 and the bottom surface 306 ranges from about 0 to about 15 degrees and in other embodiments, from about 0 to about 10 degrees.

Figure 5:
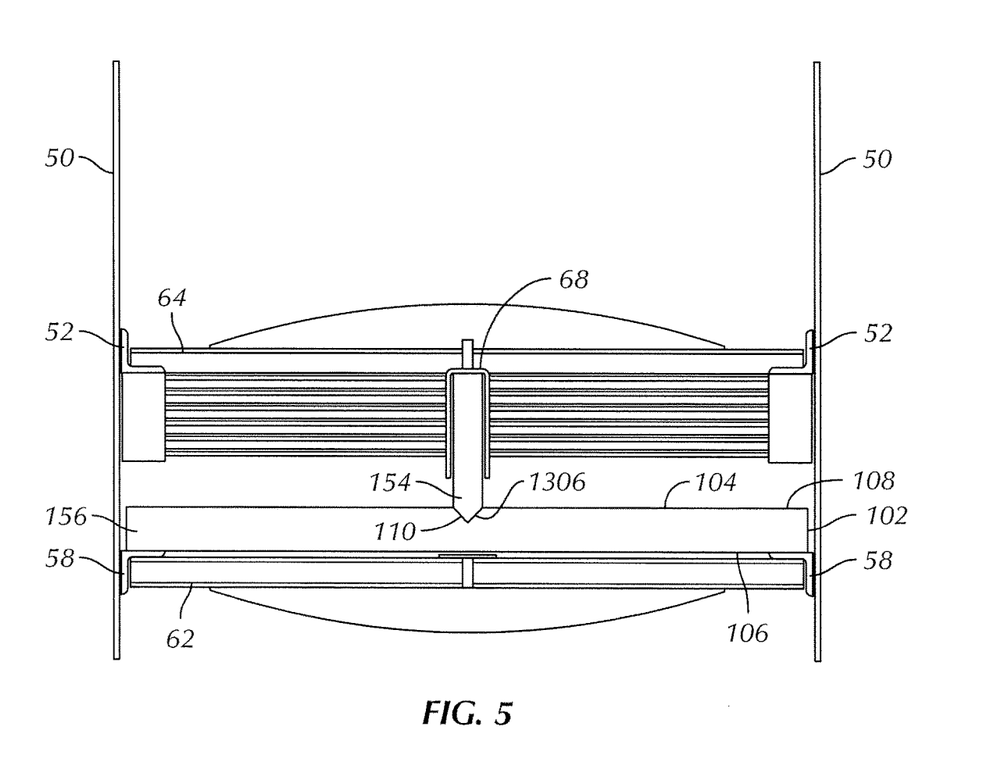
FIG. 5 illustrates an end view of a shaker screen assembly in accordance with embodiments disclosed herein
Figure 5A:
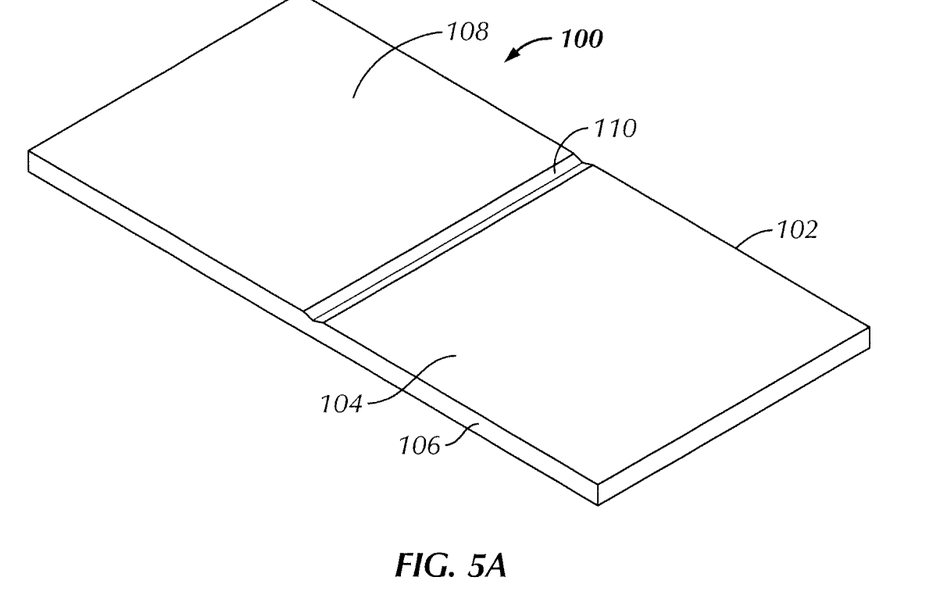
FIG. 5A illustrates a perspective view of a vibratory separator screen in accordance with embodiments disclosed herein.
Figure 5B:
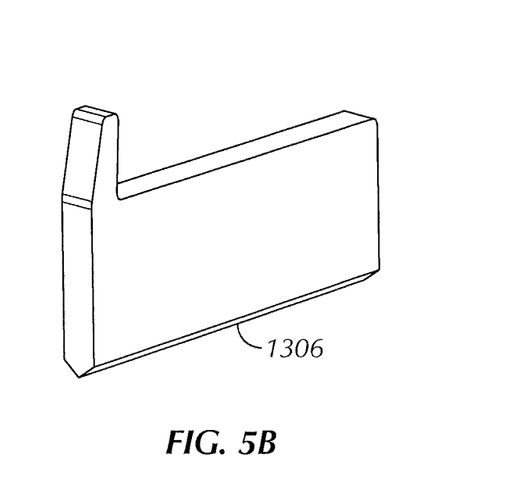
FIG. 5B illustrates a perspective view of a wedge apparatus in accordance with embodiments disclosed herein
Figure 5C:
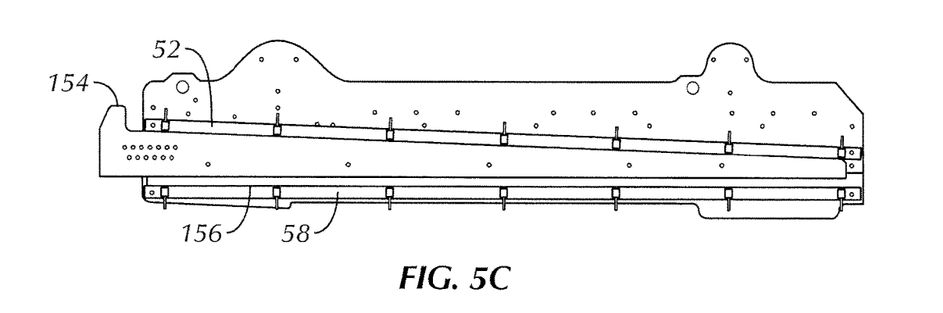
FIG. 5C illustrates a cross-sectional view of a vibratory separator screen and wedging apparatus assembly in accordance with embodiments disclosed herein.

FIG. 5 shows an end view of a shaker screen assembly installed in a vibrating separator in accordance with embodiments disclosed herein. FIG. 5A shows a perspective view of a screen 100 for a vibratory separator having a frame 102 including a top surface 104 and a bottom surface 106, and at least one filter element 108 connected to the frame 102. In some embodiments, the top surface 104 comprises a wedge engagement profile 110. In some embodiments, the wedge engagement profile 110 is located proximate the center of the screen. In other embodiments, the wedge engagement profile 110 may be located proximate between the edge of the screen and the center of the screen. For example, the wedge engagement profile 110 may be located about a quarter of the way between the edge and the center of the screen, a third of the way between the edge and the center of the screen, or any distance between the edge and the opposite edge of the screen. In other embodiments, a first wedge engagement profile 110 is located proximate the edge of the screen and a second wedge engagement profile 110 is located proximate the opposite edge of the screen. In other embodiments, the first wedge engagement profile 110 may be located proximate between the edge of the screen and the center of the screen, and the second wedge engagement profile 110 may be located proximate between the opposite edge of the screen and the center of the screen. For example, the first wedge engagement profile 110 may be located about a quarter of the way between the edge and the center of the screen, a third of the way between the edge and the center of the screen, or any distance between the edge and the center of the screen and the second wedge engagement profile 110 may be located about a quarter of the way between the opposite edge and the center of the screen, a third of the way between the opposite edge and the center of the screen, or any distance between the opposite edge and the center of the screen. Referring back to FIG. 5, the wedge engagement profile 110 complements a wedging apparatus 154. In some embodiments, the wedge engagement profile 110 traverses substantially the entire length of the screen. In other embodiments, the length of the wedge engagement profile 110 is determined by the wedging apparatus 154 and may not extend the entire length of the screen but may extend about a quarter, about a third, about a half, or about three quarters the length of the screen or any length that is complementary to the wedge apparatus 154. The wedge apparatus 154 is similar to the wedging apparatus 300 described above with respect to FIGS. 4C and 4D, except for the bottom surface. Referring to FIG. 5B, the bottom surface 1306 may be a V-shape. The bottom surface 1306 may be any shape that is complimentary to the wedge engagement profile 110 of the screen 156 and vice versa. In some embodiments, the wedging apparatus 154 will traverse the length of a plurality of screens 156 placed proximate each other (as shown in FIG. 5C). The wedge engagement profile 110 of screens 156 may be aligned. In some embodiments, the wedge engagement profile 110 is a progressive groove having a width that decreases along the vibratory screen 156, and may decrease along the length multiple vibratory screens 156. In other embodiments, the wedge engagement profile 110 is a progressive groove having a depth that decreases along the vibratory screen 156, and may decrease along the length multiple vibratory screens 156.

Figure 6A:
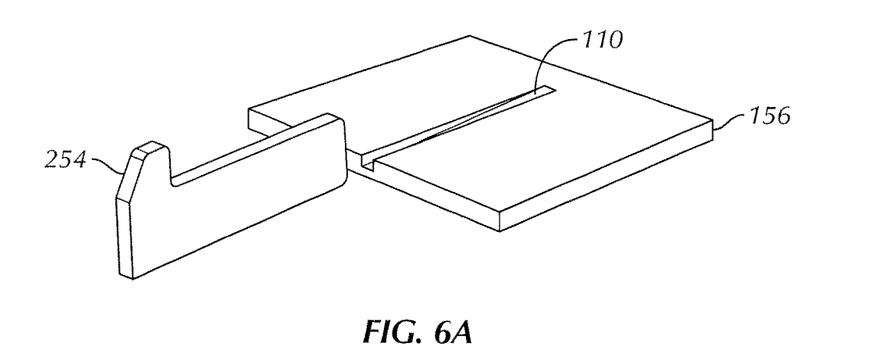
FIG. 6A illustrates a perspective view of a vibratory separator screen and wedge apparatus in accordance with embodiments disclosed herein.
Figure 6B:
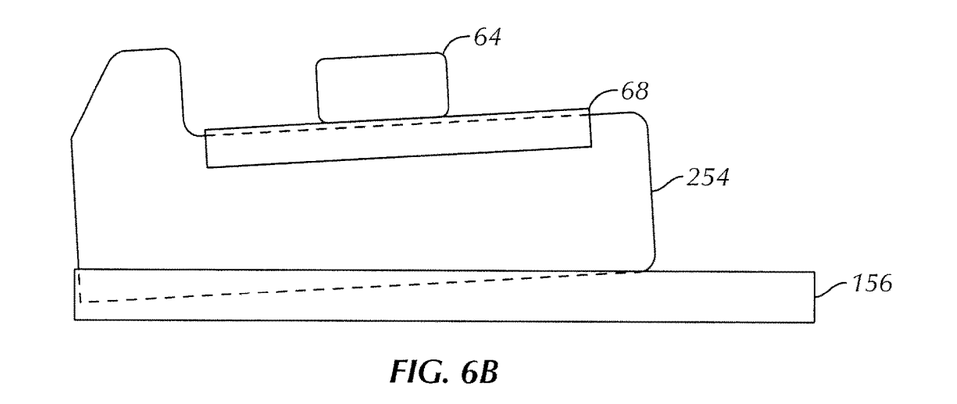
FIG. 6B illustrates a cross-sectional view of a vibratory separator screen and wedging apparatus assembly in accordance with embodiments disclosed herein.
Figure 6C:
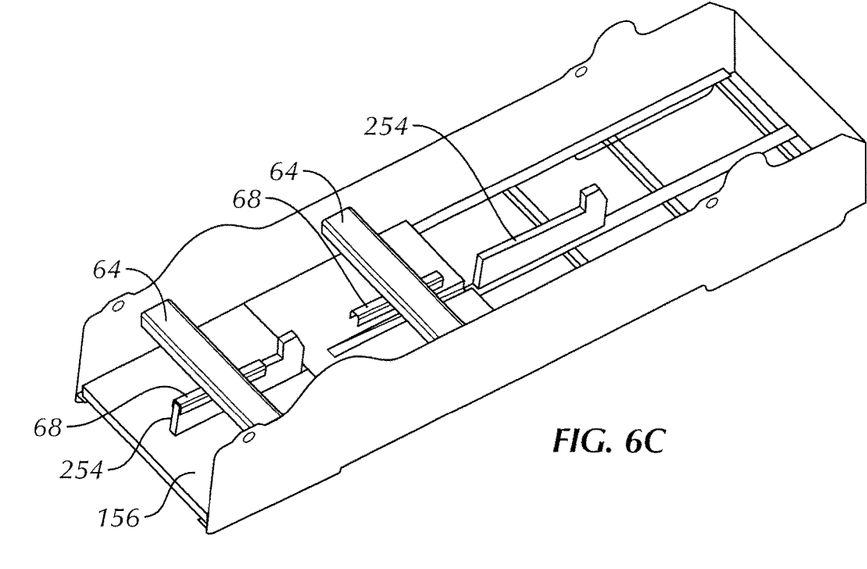
FIG. 6C illustrates a perspective view of a vibratory separator screen and wedge apparatus in accordance with embodiments disclosed herein.

Referring to FIG. 6A, the wedge engagement profile 110 is a rectangular groove having the geometry corresponding to a wedging apparatus 254. The wedging apparatus 254 is similar to the wedging apparatus 300 described above with respect to FIGS. 4A and 4B, except for the length. The wedging apparatus 254 is substantially the length of the screen 156. The wedging apparatus 254 may be any shape that is complimentary to the wedge engagement profile 110 of the screen 156 and vice versa. Referring to FIGS. 6B and 6C, the wedging apparatus 254 applies a compressive force on vibratory separator screen 156 and a wedge retainer 68. In some embodiments, the relative slope between the wedge retainer 68 and the wedge engagement profile 110 ranges from about 0 to about 15 degrees and in other embodiments, from about 0 to about 10 degrees.

In alternate embodiments, the wedge engagement profile 110 of the screen 156 may be a protrusion of any geometry which complements a groove of either wedging apparatus 154 or 254. The wedge engagement profile 110 may traverse substantially the entire length of the screen or it may traverse any length of the screen that complements the geometry of either wedging apparatus 154 or 254. The complementary geometry of the wedge engagement profile 110 and the wedging apparatus 254 provides for a minimum amount of drilling fluid to not be screened during operation. Furthermore, the arrangement of the wedge engagement profile 110 in the screen, the wedging apparatus 254, and the wedge retainer 68 provide limited damage to the filter cloth of the screen 156.

A wide variety of materials may be used in the construction of the above described shaker screen frame. In one such illustrative embodiment, a frame is constructed of welded metal, such as steel, steel alloys, aluminum, aluminum alloys, and the like, which may subsequently be coated with paint, epoxy, thermoplastic and other such protective materials. Alternatively, the frame may be constructed from composite materials including resin based composites, such as: fiberglass/resin; carbon fiber/resin; metal fiber/resin; combinations of these and the like, thermoplastic composites such as fiberglass/plastic; carbon fiber/plastic; metal fiber/plastic; combinations of these and the like; as well as combinations of various composite materials that are suitable for such applications. Finally it should be noted that the illustrative frames may be cast, stamped, forged, or machined from ferrous and non-ferrous metals, plastics, composite materials and the like.

Figure 7:
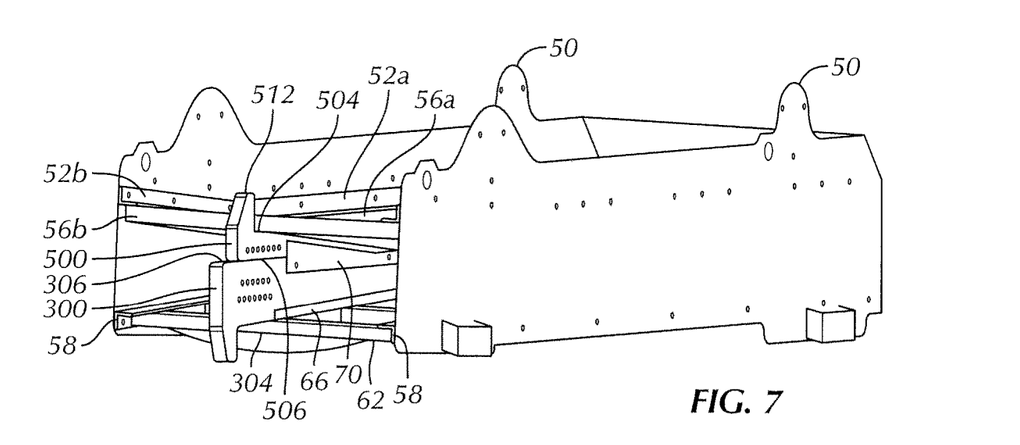
FIG. 7 illustrates perspective views of a vibratory separator screen and wedging apparatus assembly in accordance with embodiments disclosed herein.

FIG. 7 shows a perspective view of an alternate embodiment of a vibratory separator screen assembly disclosed herein. The vibratory separator screen includes a feed section 56a and a discharge section 56b. To increase the average pool depth along the screen bed, the discharge section 56b may be tilted upward relative to the feed section 56a. In some embodiments, wedge bracket 52 may include a first portion 52a and a second portion 52b. The second portion 52b may be at a different angle than the first portion 52a. In some embodiments, the second portion 52b is pivotable in relation to the first portion 52a. The second portion 52b may be at an angle ranging from about 1 degree to about 50 degrees in relation to the first portion 52b.

In some embodiments, the feed section 56a may include one or more screens 56. The screens 56 of the feed section 56a are placed underneath the first portion 52a of the wedge brackets 52. In some embodiments, the discharge section 56b may include one or more screens 56. The screens of the discharge section 56b are placed underneath the second portion 52b of the wedge brackets 52. A wedging apparatus 300 may be placed underneath the screens 56 of both the feed section 56a and the discharge section 56b and engage the length of the separator screen 56 by applying an upward force between the separator screen 56 and the wedge brackets 52 within the first portion 52a and the second portion 52b. In some embodiments, the wedging apparatus 300 (as shown in FIGS. 4A-4D) may be placed with a bottom surface 306 in contact with the proximate center of the separator screen 56 and the top surface 304 in contact with wedge retainer 66. Accordingly, contact between the separator screen 56 and the first portion 52a may be maintained. In alternate embodiments, the wedging apparatus 300 may be located proximate between the edge of the separator screen 56 and the center of the separator screen 56. For example, the wedging apparatus 300 may be located about a quarter of the way between the edge and the center of the separator screen 56, a third of the way between the edge and the center of the separator screen 56, or any distance between the edge and the opposite edge of the separator screen 56.

Figure 7A:
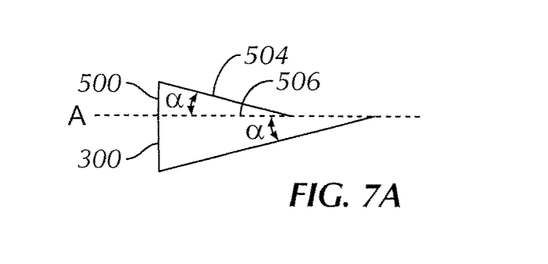
FIG. 7A illustrates a cross-sectional view of a wedging apparatus in accordance with embodiments disclosed herein.

To increase the average pool depth and capacity of the vibrator separator, a compound angle between the feed section 56a and discharge section 56b may be provided. In some embodiments, a second wedging apparatus 500 is configured to slidably engage the bottom surface 306 of the wedging apparatus 300. Referring to FIG. 7A, the second wedging apparatus 500 includes an outer polygonal surface that includes a top surface 504, a bottom surface 506, and at least one end surface 508 joining top surface 504 and bottom surface 506, providing a substantially triangular shape. Wedging apparatus 500 may be any shape known in the art such that the wedging apparatus may wedge between two vibratory separator components, thereby securing a screen 56. In alternate embodiments, wedging apparatus 500 may include two end surfaces 508, thereby forming a wedging apparatus 500 of a substantially trapezoidal shape. The length of the wedging apparatus 500 may be substantially the length of the discharge section 56b of the vibrating separator. In other embodiments, the length of the wedging apparatus 500 may be substantially the length of the entire screening surface 56. One or more apertures 510 may be located in the wedging apparatus 500 to enable a pry bar to be used to remove the wedge 500 from the vibratory separator basket (not shown). The apertures 510 may be located at the end of the wedging apparatus 500 that will be proximate the discharge end of the basket.

The top surface 504 may be formed at any angle α with respect to horizontal axis A. For example, in one embodiment, the angle α of top surface 504 may be about 0 degrees, about 5 degrees, about 30 degrees, about 45 degrees, or any angle desired by an operator. In an alternate embodiment, top surface 504 may be formed at an angle of about 0 degrees while bottom surface 506 may be formed at any angle with respect to horizontal axis A. In alternate embodiments, top surface 504 may be formed at an angle of about 0 degrees while bottom surface 506 may be formed at an angle of about 0 degrees. The use of the wedging apparatus 500 with the wedging apparatus 300 provide for independent adjustment of the pool depth of the feed section 56a. The wedging apparatus 500 may be selected to adjust the angle α with respect to horizontal axis A based upon the drilling fluid being processed in the vibratory shaker and may be changed during the shaker process for changing conditions.

Referring back to FIG. 7, wedging apparatus 500 may include a stop 512. Stop 512 may be any shape known in the art to limit how far the wedging apparatus 500 may be inserted into a vibrator separator.

The wedging apparatus 500 is placed underneath the screens 56 of the discharge section 56b and secured into engagement along the length of the discharge screen 56 to apply an upward force on the separator screen 56 to engage the second portion 52b of the wedge bracket 52. In some embodiments, the wedging apparatus 500 is placed with a top surface 504 in contact with the discharge section and a bottom surface 506 in contact with the wedging apparatus 300. Accordingly, contact between the discharge section 56b and the wedge bracket 52b may be maintained. In some embodiments, a wedge retainer 70 maintains the contact between the wedging apparatus 300 and the wedging apparatus 500. The wedge retainer 70 may be coupled to the wedging apparatus 300 and provide a channel for the wedging apparatus 500 to be inserted. In an alternate embodiment, the wedging apparatus 500 is placed within the wedge retainer 68 (not shown).

Figure 7B:
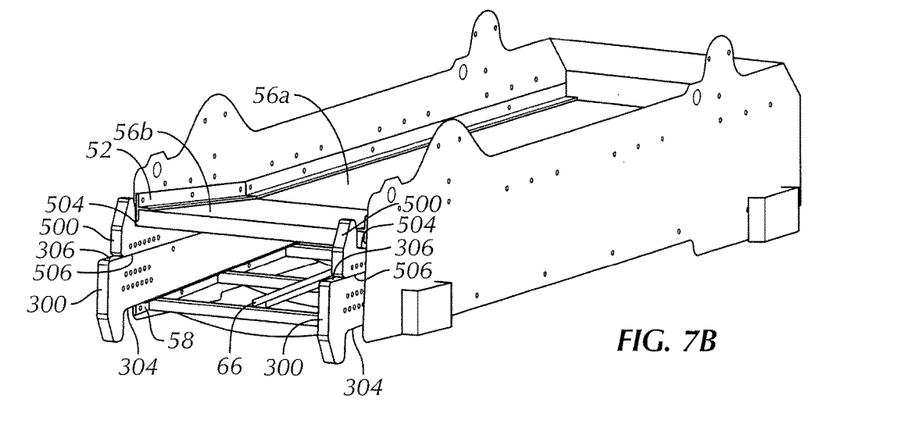
FIG. 7B illustrates a perspective view of a vibratory separator screen and wedging apparatus assembly in accordance with embodiments disclosed herein.

Referring to FIG. 7B, in other embodiments, the wedging apparatus 300 (as shown in FIGS. 4A-4D) is placed with the top surface 304 in contact with the support rail 58 coupled to the side wall and another wedging apparatus 300 is placed with the top surface 304 in contact with the support rail 58 coupled to the opposite side wall. To provide a compound angle, two wedging apparatus 500 are placed with the bottom surface 506 coupled to the bottom surface 306 of the wedging apparatus 300, each proximate the walls 50. In some embodiments, the wedging apparatus 300 and wedging apparatus 500 have complimentary surfaces for engaging each other, such as a male-female geometry or other geometries known to those skilled in the art. In alternate embodiments, the wedging apparatuses 300 are not placed proximate the side wall, but are placed some distance from the side wall.

Figure 7C:
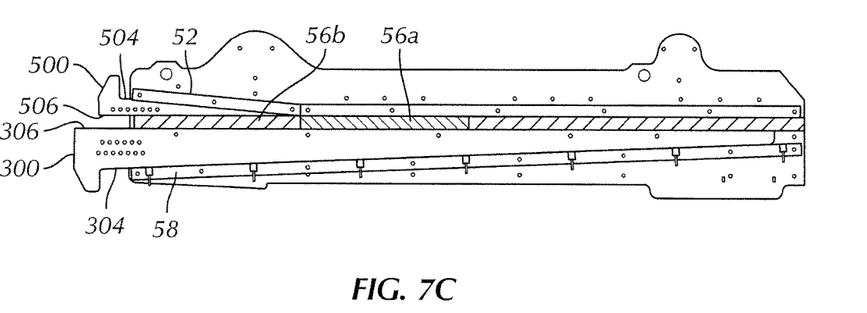
FIG. 7C illustrates a cross-sectional view of a vibratory separator screen and wedging apparatus assembly in accordance with embodiments disclosed herein.

Referring to FIG. 7C, in other embodiments, the wedging apparatus 300 (as shown in FIGS. 4A-4D) is placed with the top surface 304 in contact with the support rail 58 coupled to the side wall and another wedging apparatus 300 is placed with the top surface 304 in contact with the support rail 58 coupled to the opposite side wall. The bottom surface 306 may be in contact with the length of the entire screening surface 56. If a compound angle is not to be provided, two wedging apparatus 500 may be placed with the bottom surface 506 coupled to the top surface of the discharge section 56b, each proximate the walls 50.

Figure 8:
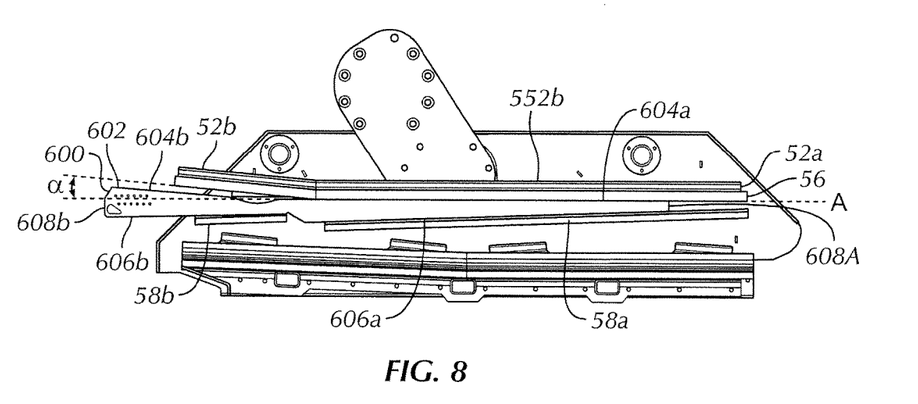
FIG. 8 illustrates a cross-sectional view of a vibratory separator screen and wedging apparatus assembly in accordance with embodiments disclosed herein.

FIG. 8 is a cross-sectional view of a vibratory separator screen and wedging apparatus assembly in accordance with embodiments disclosed herein. In some embodiments, a single wedging apparatus 600 may be used to secure a screen 56 in a vibratory separator having a compound angle. As shown, wedging apparatus 600 includes an outer polygonal surface 602 that includes a top surface 604, a bottom surface 606, and two end surfaces 608a, 608b joining top surface 604 and bottom surface 606. Wedging apparatus 600 may be any shape known in the art such that the wedging apparatus may wedge between two vibratory separator components providing a compound angle, thereby securing a screen 56. "Compound angle" is defined herein as a single surface having more than one angle. In some embodiments, the support rail 58 may include a first portion 58a and a second portion 58b. The second portion 58b may be at a different angle than the first portion 58a. In some embodiments, the second portion 58b is pivotable in relation to the first portion 58a.

In some embodiments, the top surface 604 includes a first section 604a having a first angle and a second section 604b having a second angle. The bottom surface 606 includes a first section 606a having a first angle and a second section 606b having a second angle. The top first section 604a applies an upward force on the feed section 56a to maintain the contact between the feed section 56a to the first portion 52a of the wedge bracket 52. The top second section 604b applies an upward force on the discharge section 56b to maintain the contact between the feed section 56b to the second portion 52b of the wedge bracket 52. In some embodiments, the wedging apparatus 600 may include a stop (not shown).

The wedge bracket 52 and support rail 58 may be attached to the vibratory separator basket at particular angles to correspond with the compound angle of wedging apparatus 600. In some embodiments, the angle of first section 604a may be 0 degrees, 5 degrees, 30 degrees, 45 degrees, or any angle as known to one of ordinary skill in the art. Second section 604b may be formed at a similar or different angle from that of the angle of the first section 604a. For example, in some embodiments, the angle of second section 604b may be 0 degrees, 5 degrees, 30 degrees, 45 degrees, or any angle as known to one of ordinary skill in the art.

In accordance with embodiments, described above, a wedging apparatus may be located anywhere along the width of the vibratory separator. The wedging apparatus may be located proximate between the edge of the separator screen and the center of the separator screen. For example, the wedging apparatus may be located about a quarter of the way between the edge and the center of the separator screen, a third of the way between the edge and the center of the separator screen, or any distance between the edge and the opposite edge of the separator screen. For embodiments having more than one wedging apparatus, the apparatuses may be located anywhere along the width of the vibratory separator, substantially opposite each other, although not necessarily equidistant from each other.

In accordance with embodiments, described above, the solids retention and ponding of the vibratory separator may be adjusted by using various arrangements of either a single wedging apparatus or multiple wedging apparatuses stacked on each other. By adjusting the respective slope of the screen of the vibratory separator, the operator can adjust the properties of the solids as they exit the vibratory separator. For example, a single wedging apparatus may be located proximate the center of the vibratory separator basket either above or below the vibratory separator screen. To modulate the angle of the screen, a second wedging apparatus may be added above or below the vibratory separator screen to increase the relative slope of the screen. The second wedging apparatus will stack with the wedging apparatus already there. Other arrangements provide for the wedge(s) to be located proximate the edge of the vibratory separator basket either above or below the vibratory separator screen. In some embodiments, a first wedging apparatus may be place above the vibratory separator screen and a second wedging apparatus may be placed below the vibratory separator screen. The wedging apparatuses may be located proximate the center of the vibratory separator basket or proximate the edge of the vibratory separator basket. The angle of the vibratory separator screen can be adjusted during operation to increase ponding or increase fluid head by adding or removing wedging apparatuses, either above or below the vibratory separator screen. Furthermore, the above arrangement in a multi-screen vibratory separator allows for the individual adjustment of the screens during operation.

In accordance with embodiments described above, a wedging apparatus may be formed by injection molding. In such an embodiment, a molten plastic is injected at a high pressure into a mold having an inverse shape of a desired wedging apparatus. The shape of the wedging apparatus may be, for example, any shape as detailed above. The mold may be formed by a toolmaker or moldmaker from metal, either steel or aluminum, and precision-machined to form smaller, more detailed features. Once the mold is filled with molten plastic, the molten plastic is allowed to cure and is then removed from the mold. As detailed above, the mold may be filled with any molten plastic known in the art, for example, polyurethane, polypropylene, or nylon. In alternate embodiments, the mold may be filled with rubber or a molten composite material, such as glass-filled polypropylene. Other materials may be used without departing from the scope of embodiments disclosed herein.

Alternatively, a wedging apparatus in accordance with embodiments described above may be formed by gas-assist injection molding. In this embodiment, molten plastic is injected into a mold, partially filling it with a predetermined amount of resin or molten plastic. A gas, for example, nitrogen, is introduced into the mold cavity. The gas forms hollow channels as it follows a path of least resistance, thereby directing the molten plastic to fill areas of the mold. As the gas expands in the cavity, forcing the molten plastic outward, the surfaces receiving substantially equal pressure. The molten plastic is allowed to cure, the gas may be vented through a nozzle or vent, and the wedging apparatus may be removed from the mold.

Any material known in the art may be used for both injection molding and gas-assist injection molding wedging apparatuses. In one embodiment, an outer polygonal surface of a wedging apparatus may be formed of any material with a low compression set and high impact performance. For example, an outer polygonal surface of a wedging apparatus may be formed of a plastic, such as polyurethane, polypropylene, or nylon, rubber, or a composite material, such as a glass-filled polypropylene. Further, an inner core of a wedging apparatus, defined by an outer polygonal surface, may be formed of or filled with any material known in the art. For example, an inner core of a wedging apparatus may be filled with a plastic, such as polyurethane, polypropylene, or nylon, rubber or a composite material, such as a glass-filled polypropylene. Alternatively, an inner core of a wedging apparatus may be filled with a foam, gas or steel support. In embodiments where an inner core of a wedging apparatus is substantially enclosed, and therefore not in contact with drilling fluid flowing over a shaker screen, the inner core may be formed from or filled with a material of lower chemical resistance. Alternatively, a wedging apparatus in accordance with embodiments described above may be formed by open casting or compression molding.

While the present disclosure has been described with respect to a limited number of embodiments, those skilled in the art, having benefit of this disclosure, will appreciate that other embodiments may be devised which do not depart from the scope of the present disclosure. Accordingly, the scope of the present disclosure should be limited only by the attached claims.

What is claimed is:

1. A wedging apparatus comprising:
a polygonal shaped structure having a first outer surface configured to secure a screen to a vibrating separator, the first outer surface comprising a bottom surface, a top surface opposite the bottom surface, a first end surface and a second end surface opposite the first end surface, and the first and second end surfaces join the top and bottom surfaces and define a length of the polygonal shaped structure,
wherein the polygonal shaped structure has a horizontal axis and a height defined between the top and bottom surfaces of the first outer surface and is configured to apply force on the screen, wherein the top surface is provided at a first angle of about zero degrees with respect to the horizontal axis and the bottom surface is provided at a second angle of about zero degrees with respect to the horizontal axis such that the height of the polygonal shaped structure is constant and continuous across at least a majority of the length of the polygonal shaped structure defined between the first and second end surfaces of the first outer surface, and further wherein the majority of the length consists of at least 50% of the length of the polygonal shaped structure defined between the first and second end surfaces of the first outer surface.

2. The wedging apparatus of claim 1, wherein the first outer surface further comprises a first side and a second side, wherein the first side joins a first edge of the top surface and a first edge of the bottom surface, and the second side joins a second edge of the top surface and a second edge of the bottom surface.

3. The wedging apparatus of claim 1, wherein the first outer surface comprises at least one from the group of a composite, a polyurethane, and a polypropylene, wherein the composite comprises glass-filled polypropylene.

4. The wedging apparatus of claim 1, wherein the polygonal shaped structure has an inner core providing a supporting structure to the wedging apparatus wherein the inner core comprises at least one selected from a group of a metal, a polyurethane, a polypropylene, and a nylon.

5. The wedging apparatus of claim 1, wherein the bottom surface comprises a substantially flat surface.

6. The wedging apparatus of claim 1, wherein the bottom surface comprises a first surface and a second surface, wherein the first surface has an angle ranging from about 2 degrees to about 45 degrees with respect to the second surface of the bottom surface such that an apex is provided on the bottom surface and said apex extends in a longitudinal direction along the length of the polygonal shaped structure, wherein the first and second surfaces of the bottom surface are substantially flat surfaces beginning at said apex and extending continuous and uninterrupted across entire lengths of the first and second surfaces away from said apex.

7. The wedging apparatus of claim 1, wherein the bottom surface comprises a first surface that is substantially flat and a second surface having an angle ranging from about 2 degrees to about 45 degrees with respect to the first surface of the bottom surface.

8. The wedging apparatus of claim 1, wherein the top surface comprises a substantially flat surface.

9. The wedging apparatus of claim 1, wherein the top surface comprises a first surface having an angle ranging from about 2 degrees to about 45 degrees with respect to a second surface of the top surface such that an apex is provided on the top surface and said apex extends in a longitudinal direction along the length of the polygonal shaped structure.

10. The wedging apparatus of claim 1, wherein at least one surface selected from the top surface and the bottom surface comprises a screen engagement profile.

11. The wedging apparatus of claim 1, further comprising a stop disposed on the first or second at least one end surface.

12. The wedging apparatus of claim 1, further comprising one or more protrusions usable for removing the wedging apparatus from a vibratory separator basket of the vibrating separator.

13. The wedging apparatus of claim 4, wherein the supporting structure comprises rods.

14. The wedging apparatus of claim 11, wherein one or more apertures are located within the stop disposed on the at least one end surface.

15. The wedging apparatus of claim 1, wherein a shape of the bottom surface is a continuous and uninterrupted V-shape having an apex extending in a longitudinal direction along the length of the polygonal shaped structure.

16. The wedging apparatus of claim 1, wherein a shape of the bottom surface of the first outer surface engages a wedge engagement profile of the screen.

17. A wedging apparatus comprising:
a polygonal shaped structure having a length defined between a first end and a second end located opposite with respect to the first end of the polygonal shaped structure and an outer surface configured to secure a screen to a vibrating separator, the outer surface comprising a bottom side, a top side opposite the bottom side, and the first end and the second end joining the top side and the bottom side, wherein the bottom side comprise a first angled surface and a second angled surface that extend outwardly and form an apex on the bottom side that extends in a longitudinal direction of the polygonal shaped structure along the length of the polygonal shaped structure, wherein the first and second angled surfaces begin at said apex, extend continuously and uninterrupted across entire lengths of the first and second angled surfaces away from said apex and terminate at opposing sides of the outer surface, wherein the opposing sides join the top and bottom sides and the first and second ends, and further wherein the bottom side has a bottom surface extending the along the length of the polygonal shaped structure from the first end to the second end and consisting of the apex connecting the first and second angled surfaces such that a height of the polygonal shaped structure is defined between the top side of the outer surface and the apex at the bottom edge of the bottom side of the outer surface.

18. A wedging apparatus comprising:
a first polygonal shaped structure having a first outer surface comprising a bottom surface, a top surface opposite the bottom surface, a first end surface and a second end surface opposite the first end surface, wherein at least the second end surface joins the top surface and the bottom surface, wherein the first polygonal shaped structure has a first height defined between the top and bottom surfaces, a length defined between the first and second end surfaces, a first stop provided adjacent to the first end and having a second height, wherein the first height increase along the length of the first polygonal shaped structure from the second end surface to the first stop and the second height of the first stop is greater than the first height of the first polygonal shaped structure; and a second polygonal shaped structure having a second outer surface comprising a bottom surface, a top surface opposite the bottom surface, and at least one end surface joining the top surface and the bottom surface of the second polygonal shaped structure, wherein the second polygonal shaped structure has a first height defined between the top and bottom surfaces, a length defined between the first and second end surfaces, a second stop provided adjacent to the first end and having a second height, wherein the first height increase along the length of the second polygonal shaped structure from the second end surface to the second stop and the second height of the second stop is greater than the first height of the second polygonal shaped structure, wherein the second polygonal shaped structure extends along some length of the first polygonal shaped structure such that a portion of the first outer surface of the first polygonal shaped structure and a portion of the second polygonal shaped structure couple together to provide a compound angle configured to secure a screen to a vibrating separator.

* * * * *